Sept. 29, 1959   H. R. WATTS   2,906,544
HEAVY DUTY STABILIZING TRAILER HITCH
Filed May 31, 1957   2 Sheets-Sheet 2
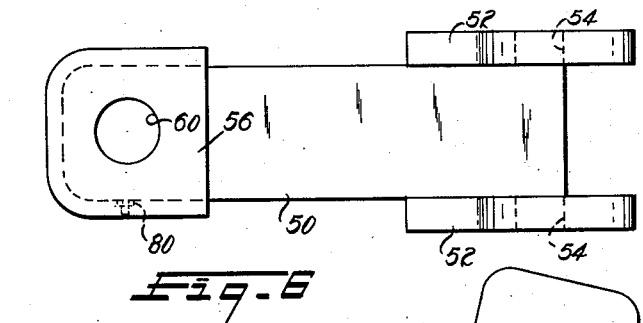
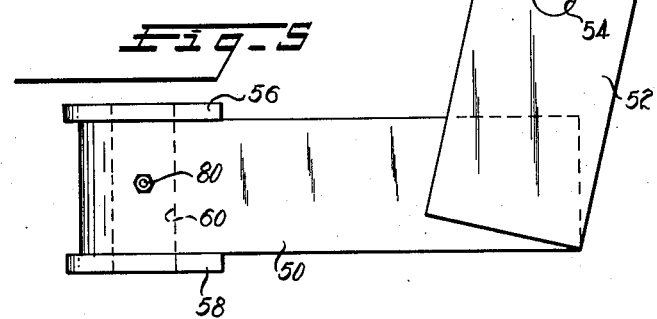
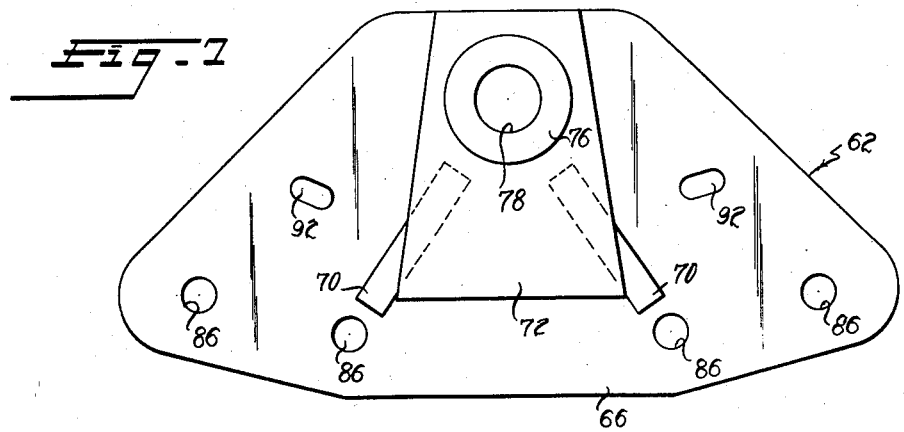
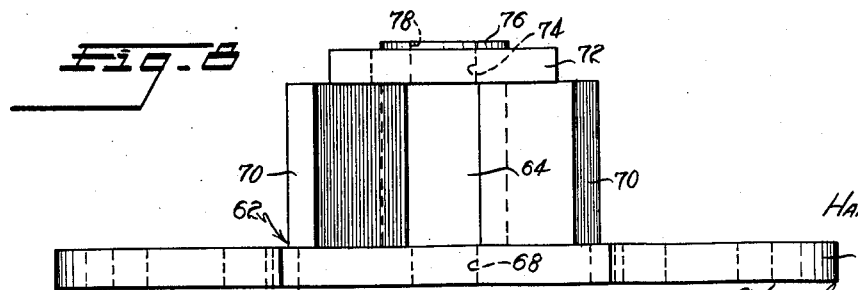
INVENTOR
HAROLD R. WATTS
BY
ATTORNEY United States Patent Office 2,906,544
Patented Sept. 29, 1959

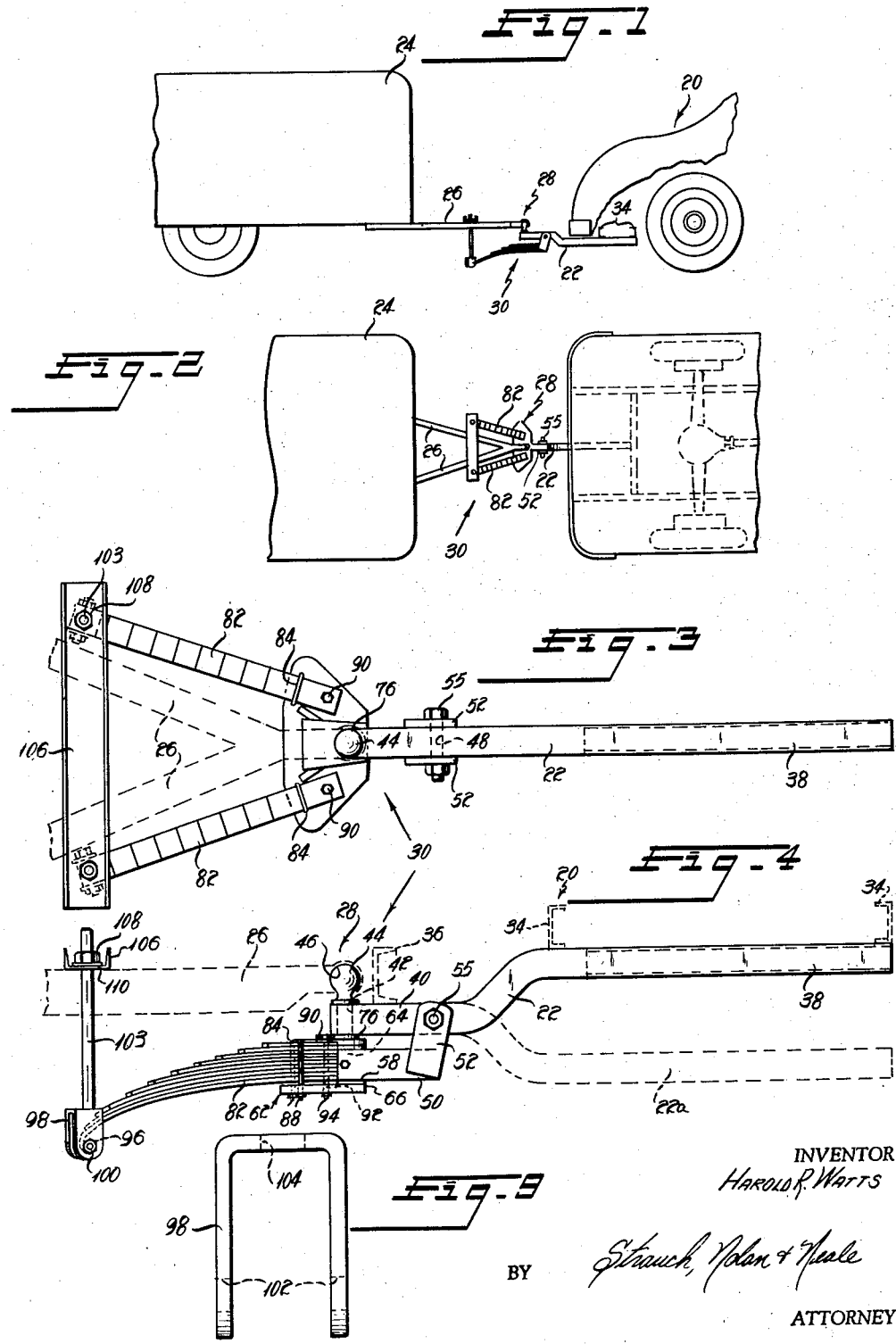

2,906,544

HEAVY DUTY STABILIZING TRAILER HITCH

Harold R. Watts, Fallon, Nev.

Application May 31, 1957, Serial No. 662,641

7 Claims. (Cl. 280—406)

The present invention relates to a hitching device for trailers drawn by cars, pick-up trucks and the like, and more particularly to a stabilizing trailer hitch used in conjunction with a conventional trailer hitch to redistribute the weight of the towed vehicle forwardly on the frame of the towing vehicle and stabilize both vehicles.

Most trailer hitches used today were designed and constructed for trailers of a maximum length of 30 feet. However, the more modern trailers are constructed so that their over-all length is 50 feet or more, and they sometimes include three bedrooms and two stories, and even folded room extensions that can be extended sideways from the trailer. Such large trailers have a drawbar weight of 1,000 pounds or more, and some impose as much as 1,300 pounds on the trailer hitch. Most trailer hitches are not strong enough to take this large weight. This high load at the hitch causes the towing vehicle, which is ordinarily a car or small truck, to become lowered in the rear portion and raised in the front portion. For example, if you place 1,000 pounds load on the rear bumper of a pick-up truck (which is about 50 inches to the rear of the rear axle) it would raise the front end of the pick-up truck approximately three inches. This causes the towing vehicle to be out of balance, puts the steering out of adjustment, and makes driving very difficult and unsafe.

The present invention provides a novel heavy duty stabilizing trailer hitch which supplements and improves upon the ordinary ball and socket connection now commonly used for connecting trailers to towing vehicles.

It is an object of the present invention to provide a stabilizing trailer hitch which lifts the rear end of the towing vehicle to normal height and causes its front end to be lowered to normal height, and thereby distributes the weight evenly on all four wheels of the towing vehicle. It is a related object of the present invention to provide such a stabilizing trailer hitch which stabilizes both the towing and towed vehicles, eliminates road sway and whip even when the trailer is pulled at relatively high speeds over relatively rough road surface, and reduces excessive wear of the rear tires on the towing vehicle.

It is another object of the present invention to provide a heavy duty stabilizing trailer hitch that relieves the ordinary ball and socket joint trailer hitch from undue stresses and strains transmitted from the trailer to the chassis of the towing vehicle which might cause it to fail.

It is another object of the present invention to provide a novel heavy duty stabilizing trailer hitch which has a wide three-point suspension so that it can receive greater weight with better load distribution and reduced stress at any one point.

It is a further object of the present invention to provide a novel stabilizing trailer hitch that is adaptable to all model cars and pick-ups, and to all-width trailer tongues without any change of the towing vehicle frame or the ordinary trailer tongue. It is a related object to provide a curved drawbar adaptable, without change, to both pick-up trucks and cars. It is another related object to provide such a trailer hitch with springs arranged so that they are readily adjustable to trailer tongues of varying width.

It is a further object of the present invention to provide a novel stabilizing trailer hitch which can be simply connected to the towing vehicle by placement of a few bolts.

It is another object of the present invention to provide a novel stabilizing hitch including a novel pivot connection of unitary construction that provides added safety.

It is still another object of the present invention to provide a heavy duty rugged stabilizing trailer hitch which can safely handle even larger trailers than the largest trailers built to date, yet can be economically made at relatively low cost even in small volume, and also lends itself to low cost mass production.

These and other objects of the present invention will appear from the following description, the claims appended thereto, and from the annexed drawings in which reference characters designate like parts throughout the several views, and wherein:

Figure 1 is a fragmentary side elevational view of a stabilizing trailer hitch according to the present invention as it appears when associated with a trailer and towing vehicle, which are also connected by a conventional hitch;

Figure 2 is a fragmentary top plan view of connected vehicles and stabilizing trailer hitch of the present invention, shown in Figure 1;

Figure 3 is an enlarged plan view showing the stabilizing trailer hitch of the present invention, and also showing in phantom lines the associated parts of trailer, towing vehicle and conventional hitch;

Figure 4 is a side elevation view of the stabilizing trailer tongue, with part of the trailer shown in phantom lines;

Figure 5 is a side elevation view of the intermediate swivel and hitch sub-assembly incorporated in the stabilizing trailer hitch of this invention;

Figure 6 is a top plan view of the sub-assembly shown in Figure 5;

Figure 7 is a top plan view of the spring and swivel bracket sub-assembly incorporated in the stabilizing trailer hitch of this invention;

Figure 8 is a rear elevation view of the spring and swivel bracket sub-assembly shown in Figure 7; and Figure 9 is an end elevation view of the clevis shown in Figure 3 looking in the direction of arrows 9—9 in that figure.

Referring to the drawings, and more especially Figures 1 and 2, there is shown a towing vehicle generally indicated at 20 having a drawbar 22 mounted thereon, a trailer generally indicated at 24 having a triangular trailer tongue 26, an ordinary ball and socket type trailer hitch generally indicated at 28, and the novel stabilizing trailer hitch of the present invention generally indicated at 30.

Referring particularly to Figures 3 and 4, curved drawbar 22 is secured to the underside of the cross frame members 34 of the towing vehicle 20 by any suitable means such as welding, bolting or a bracket. Drawbar 22 extends rearwardly of the towing vehicle 20 with the rearward portion thereof engaging the underside of its rear bumper 36. The forward part 38 of the drawbar 22 may be made of square tubing to lighten the over-all weight of the assembly. The rearwardly extending portion 40 of the drawbar 22 is preferably made of a solid steel bar for maximum sturdiness since this portion of the drawbar is connected to the conventional trailer hitch 28 and the novel load stabilizing trailer hitch 30.

In Figure 3, the drawbar 22 is shown as it would be mounted on the cross frame members 34 when the towing vehicle 20 is a pick-up truck. Because of its curved shape, drawbar 22 is adapted to be suspended on the underside of the chassis of a car and clear its gas tank, by inverting the bar as illustratively shown in phantom line at 22a in Figure 3.

The rearward portion 40 of drawbar 22 is drilled and tapped at 42 to receive any standard trailer ball 44 which is received in the socket 46 on the end of trailer tongue 26 as shown in dotted outline in Figure 4. Rearward portion 40 of drawbar 22 is also provided with a transversely extending drilled hole 48 for connecting drawbar 22 to the stabilizing hitch 30.

Referring to Figures 3-6, the novel stabilizing trailer hitch of this invention generally indicated at 30 comprises an intermediate swivel and hitch sub-assembly consisting of a leverage tongue or bar 50 having a pair of upstanding lugs 52 welded on the sides thereof adjacent its forward end and provided with a pair of aligned holes 54. Stabilizing hitch 30 is connected to drawbar 22 by a bolt 55 which is passed through hole 48 in drawbar 52 and holes 54 in lugs 52 as shown in the drawings. The rearward end of leverage tongue 50 is provided with upper and lower bearing plates 56 and 58, and a bore 60 that extends vertically through leverage tongue 50 and plates 56 and 58 as shown. The leverage tongue or bar 50 is pivotally connected to the spring and swivel bracket generally indicated at 62 by means of kingpin 64 which extends through the bore 60.

Referring more particularly to Figures 3, 7, and 8, the spring and swivel bracket generally indicated at 62 comprises a flat trapezoidal plate 66 having a drilled hole 68 which receives the lower end of kingpin 64. A pair of converging supporting blocks 70 are vertically disposed on the upper side of plate 66 and securely welded thereto. A plate 72 is in turn welded to the tops of blocks 70 and has an aperture 74 extending therethrough which receives the upper end of kingpin 64. The block 70 and plate 72, and the kingpin 64 and plates 66 and 72, are preferably welded together to form a unitary kingpin assembly after the intermediate swivel and leverage tongue 50 is assembled on the bracket plate 66 with the kingpin 64 extending through its bore 60. A large flat washer 76 having a central aperture 78 which receives the uppermost portion of kingpin 64 is welded onto the top of plate 72 to provide a turntable upon which the rear end 40 of drawbar 22 rests when the trailer hitch is assembled, as shown in Figures 3 and 4. A zerk fitting 80 is provided in the side of leverage tongue 50 communicating with bore 60. Zerk 80 provides a means for lubricating the surfaces between the kingpin 64 and tongue bar 50, and between wear plates 56 and 58 and plates 66 and 72. It will be noted that when hitch 30 is assembled, the kingpin 64 is centered beneath the ball and socket connection 28 thus forming substantially in-line swivel points between the towing vehicle and trailer tongue at conventional hinge 28 and the novel load stabilizing hitch 30.

A pair of like leaf springs 82 are mounted on, and extend rearwardly and outwardly from, the plate 66 of bracket 62. Each of the leaf springs 82 is mounted in place on plate 66 by a U-bolt 84 encompassing the spring and passing through drilled apertures 86 in the rearward portion of plate 66, and a bolt 90 extending through the butt of the spring and apertures 92 in plate 66. U-bolt 84 and bolt 90 are suitably secured by nuts 88 and 94, respectively. The bolt holes 92 in plate 66 are elongated, as shown more particularly in Figure 7, to permit adjustment of the angle between the springs 82 for more efficient use with narrower or wider trailer tongues.

The spring eye 96 at the rearward end of each of springs 82 is attached to a U-shaped clevis 98 by means of a bolt 100 extending through aligned apertures 102 in the sides of the clevis 98 and suitably secured by a nut and lock washer.

A pair of elongated tension bolts 103 are provided, one each extending through the hole 104 in the central portion of clevis 98 at the end of each spring 82. These tension bolts 103 pass through apertures in a channel-shaped crossmember 106 which lies across the upper side of trailer tongues 26, and are held in place by nuts 108, with split lock washers 110 being interposed between the nuts 108 and the adjacent web surface of channel crossmember 106. The apertures in channel bar 106 through which tension bolts 103 extend are slanted and elongated similarly to above-described apertures 92 in plate 66, to similarly permit an adjustment of the position of the springs 82 for wider or narrower trailer tongues.

Tightening of the nuts 108 on the tension bolts 103 forces the channel-shaped crossbar 106 against the top of the trailer tongue members 26, and forces leaf springs 82 towards the heavy channel bar 106 and the trailer tongues 26. Thus the tightening of the nuts 108 either raises the rear portion of the springs 82 upward, or lowers the trailer tongues 26 downward or both. This action causes the socket portion 46 of the trailer tongue 26 to press downwardly against the ball 44 in turn forcing downwardly the rearward portion 40 of drawbar 22. At the same time the leverage of the springs 82 which are rising at their rearward portions at bolt 103 causes drawbar 22 to lower at its forward portion 38 around a pivot point approximately located at the trailer ball 44. This redistributes the load imposed by the trailer to the forward axle of the towing vehicle 20, and the screws 108 can be adjusted on the tension bolts 103 so that the load is substantially evenly distributed on all four wheels of the towing vehicle. As a result, stabilizing hitch 30 improves the steering of the towing vehicle, eliminates sway and whip of the trailer, and, together with the stabilizing action of three-point suspension at bolts 103 and ball hitch 28, gives a guiding and towing stability not heretofore available in any other trailer hitch.

It will be noted that both the conventional trailer hitch means 26—28—22 and the novel supplementary stabilizing trailer hitch means 26—30—22 each connect the trailer and towing vehicle for turning about substantially the same vertical axis, but there is no direct connection between the two hitches 28 and 30. The two hitches thus act in unison but independently of each other.

The permanent connection between intermediate swivel bar 50 and the spring and swivel bracket 62, with kingpin 64 being welded solid at both ends to form a unitary structure, provides an added safety not found in other hitches of this general type.

It will be apparent from the foregoing description that all that is necessary to apply the novel stabilizing trailer hitch 30 of the present invention is to mount the crossbar 106 on the trailer tongues 26, secure the retaining bolt 55 to drawbar 22, and then fasten the conventional trailer hitch 28. The described spring and tension bolt arrangement provides a means of compensating for changes in trailer load.

The above-described novel heavy duty stabilizing hitch 30 can be built to extra heavy duty specifications with heavy springs at relatively low cost and is capable of handling safely trailers substantially larger than the largest trailers built today.

It will be apparent from the foregoing description that the present invention provides a novel improved heavy duty stabilizer hitch which achieves the above-discussed objects and advantages.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stabilizing trailer hitch comprising: a drawbar adapted to be secured to a towing vehicle and extend rearwardly therefrom substantially horizontally; part of a conventional trailer hitch mounted on the upper side of said drawbar adjacent the rearward end thereof; a swivel bar and means for securing it to said drawbar, said swivel bar having a bore extending vertically therethrough; a spring and swivel bracket including a vertically disposed kingpin extending through said bore of the swivel bar, so that said swivel bar and said bracket can move angularly with respect to each other; a pair of leaf springs each mounted at one end thereof on said swivel bracket and extending therefrom; a tension bolt connected to the free end of each leaf spring; a cross bar having spaced apertures through which one of said tension bolts extends, said crossbar being adapted for placement over the upper side of a trailer tongue, with cooperating threaded means on said bolts for displacing the free ends of said leaf springs towards the trailer tongue, thereby causing said swivel bracket to be urged against said drawbar on the side thereof opposite said conventional trailer hitch part, with said kingpin being substantially in alignment with said conventional trailer hitch part so that the trailer tongue and said leaf springs and swivel bracket turn with respect to said drawbar about substantially the same axis.

2. A stabilizing trailer hitch as defined in claim 1, wherein said drawbar is curved so that it is adapted to be secured on pick-up trucks and cars by appropriate orientation thereof.

3. A stabilizing trailer hitch as defined in claim 1, further comprising means for lubricating the kingpin connection and related moving parts.

4. A stabilizing trailer hitch as defined in claim 1, wherein said kingpin is integrally secured at both ends with the supporting parts of said swivel bracket, and said swivel bar is permanently secured on said kingpin by said supporting parts.

5. A stabilizing trailer hitch as defined in claim 1, further comprising a bearing plate on the top of said spring and swivel bracket adapted to bear against the underside of the drawbar.

6. A stabilizing trailer hitch as defined in claim 1, wherein said leaf springs extend from said swivel bracket at a diverging angle, and the ends of said leaf springs are mounted on said spring and swivel bracket with adjustable means so that the angle between said leaf springs can be varied according to variations in the size of trailer tongues.

7. A stabilizing trailer hitch as defined in claim 1, wherein the spaced apertures in said crossbar are of such size and shape as to permit adjustment of the angle between the leaf springs.

References Cited in the file of this patent
UNITED STATES PATENTS

| | | |
|---|---|---|
| 2,680,626 | Hedgpeth | June 8, 1954 |
| 2,715,034 | Cornwall | Aug. 9, 1955 |
| 2,772,893 | Wettstein | Dec. 4, 1956 |
| 2,793,879 | Bair | May 28, 1957 |